UNITED STATES PATENT OFFICE.

JOHN MANNING, OF NEW YORK, N. Y.

PAINT-OIL.

SPECIFICATION forming part of Letters Patent No. 269,591, dated December 26, 1882.

Application filed February 14, 1882. (Specimens.)

*To all whom it may concern:*

Be it known that I, JOHN MANNING, a resident of the city, county, and State of New York, have invented certain new and useful Improvements in Paint-Oils; and I do hereby declare that the following is a full, clear, and exact description thereof.

This invention relates to the manufacture of a fine and pure oil for paint fully equal to and in many respects superior to linseed-oil, and made at much less cost; and it has for its object to produce for the trade a cheap and durable paint-oil manufactured by a cold admixture process, and well adapted for lead, zinc, and mineral paints or pigments produced by an admixture.

To manufacture my improved paint-oil, I first combine the rosin and naphtha in the proportion of about eight pounds of rosin to one gallon of naphtha by mixing them and allowing them to stand about three weeks until the rosin is thoroughly dissolved by the naphtha without the aid of heat. This dissolving of the rosin cold in naphtha gives greater purity and brilliancy in the resultant oil. To the quantity as above named I add and thoroughly admix therewith about two gallons of linseed-oil, either raw or boiled, about two ounces of sugar of lead, and about two gills of turpentine. The resultant compound thus prepared from these ingredients without special apparatus, without the application of heat, and with but a little manual labor, has a fine clear color and a good heavy body, and is fully equal to the best linseed-oil measure for measure, flows as freely, excels in durability, and dries more readily. For gloss and finish it is unsurpassed, while its cost is much less than that of linseed-oil, an important consideration. Also, another advantage due to this cold process is that the volatile element of the solvent is not driven off, and does not deprive the resultant oil of its brilliancy. Again, expensive heating apparatus and expensive treatment are avoided.

This prepared paint-oil, which is a substitute for linseed-oil, is used in the same manner and proportion for admixing with a body of lead, zinc, or other paints or pigments for use. It is also adapted for all kinds of work, remaining unaffected by exposure to the weather and changes of temperature.

What I claim as new, and desire to secure by Letters Patent, is—

The paint-oil as a substitute for linseed-oil, composed of naphtha, one gallon; rosin, eight pounds, mixed in a cold state; linseed-oil, two gallons; and spirits of turpentine, two gills, all combined and mixed in the manner hereinbefore stated.

In testimony whereof I have signed my name to this specification in the presence of two subscribing witnesses.

JOHN MANNING.

Witnesses:
 DAVID A. BURR,
 JOHN A. ELLIS.